(12) United States Patent
Wang et al.

(10) Patent No.: US 12,348,341 B2
(45) Date of Patent: Jul. 1, 2025

(54) METHOD AND APPARATUS FOR ESTIMATING DIRECT CURRENT INTERFERENCE, STORAGE MEDIUM AND TERMINAL

(71) Applicant: SPREADTRUM COMMUNICATIONS (SHANGHAI) CO., LTD., Shanghai (CN)

(72) Inventors: Dajin Wang, Shanghai (CN); Hongli Yuan, Shanghai (CN); Chongxiang Zhong, Shanghai (CN); Haitao Zhang, Shanghai (CN)

(73) Assignee: SPREADTRUM COMMUNICATIONS (SHANGHAI) CO., LTD., Shanghai (CN)

( * ) Notice: Subject to any disclaimer, the term of this patent is extended or adjusted under 35 U.S.C. 154(b) by 11 days.

(21) Appl. No.: 18/344,991

(22) Filed: Jun. 30, 2023

(65) Prior Publication Data

US 2023/0353430 A1 Nov. 2, 2023

Related U.S. Application Data

(63) Continuation of application No. PCT/CN2021/131134, filed on Nov. 17, 2021.

(30) Foreign Application Priority Data

Dec. 30, 2020 (CN) .......................... 202011643029.3

(51) Int. Cl.
  *H04L 25/06* (2006.01)
  *H04B 17/345* (2015.01)
(52) U.S. Cl.
  CPC ............ *H04L 25/06* (2013.01); *H04B 17/345* (2015.01)

(58) Field of Classification Search
  CPC ..... H04L 25/06; H04L 25/061; H04L 25/069; H04L 25/068; H04L 25/067; H04B 17/345; H04B 17/336; H04B 17/318
  See application file for complete search history.

(56) References Cited

U.S. PATENT DOCUMENTS

2009/0041161 A1  2/2009 Jian et al.
2010/0091920 A1* 4/2010 Alexander ............ H04L 1/0054
                                                     375/350

(Continued)

FOREIGN PATENT DOCUMENTS

CN       1744590 A    3/2006
CN     109995458 A    7/2019

(Continued)

OTHER PUBLICATIONS

International Search Report for International Application No. PCT/CN2021/131134; Mailing Date, Jan. 28, 2022.

*Primary Examiner* — Khanh C Tran
(74) *Attorney, Agent, or Firm* — CANTOR COLBURN LLP (57) ABSTRACT

A method and apparatus for estimating Direct Current (DC) interference, a storage medium and a terminal are provided. The method includes: performing an accumulative adding calculation on frequency-domain modulation symbols on a corresponding frequency point of DC interference to obtain a real-time accumulated value; updating a historical accumulated value using the real-time accumulated value based on that a number of times of accumulation reaches a first preset number; or calculating a real-time accumulated average value and a long-term accumulated average value based on the real-time accumulated value and a number of times of accumulation, every time a second preset number of frequency-domain modulation symbols are accumulated, wherein the second preset number is smaller than the first (Continued)

preset number; and calculating a DC interference estimated value based on the long-term accumulated average value or an updated historical accumulated value.

20 Claims, 4 Drawing Sheets

(56) References Cited

U.S. PATENT DOCUMENTS

2017/0195147 A1\* 7/2017 Sarrigeorgidis ......... H04B 1/30
2020/0076654 A1\* 3/2020 Sarrigeorgidis ......... H04B 1/30

FOREIGN PATENT DOCUMENTS

| CN | 110536329 A | 12/2019 |
| CN | 112737717 A | 4/2021 |
| KR | 100358410 B1 | 10/2002 |

\* cited by examiner

METHOD AND APPARATUS FOR ESTIMATING DIRECT CURRENT INTERFERENCE, STORAGE MEDIUM AND TERMINAL

CROSS-REFERENCE TO RELATED APPLICATIONS

This application is a continuation under 35 U.S.C. § 120 of PCT/CN2021/131134, filed Nov. 17, 2021, which is incorporated herein by reference, and which claimed priority to Chinese Application No. 202011643029.3, filed Dec. 30, 2020. The present application likewise claims priority under 35 U.S.C. § 119 to Chinese Application No. 202011643029.3, filed Dec. 30, 2020, the entire content of which is also incorporated herein by reference.

TECHNICAL FIELD

The present disclosure generally relates to communication technology field, and more particularly, to a method and apparatus for estimating Direct Current (DC) interference, a storage medium and a terminal.

BACKGROUND

In the 5th generation mobile networks or 5th generation wireless systems (5G), also known as New Radio (NR), due to special settings of Orthogonal Frequency Division Multiplexing (OFDM) systems, a base station generates a DC interference at a sender (Tx DC). The base station will eliminate the Tx DC interference, but there is still a small amount of residue about −45 dBc. For 100M bandwidth, the residue is about −10 dB which corresponds to a Signal to Interference Ratio (SIR) of 10 dB. At a high signal to noise ratio, performance may degrade significantly.

In existing techniques, estimation of DC interference is usually completed in a time domain. In a Digital Front End (DFE) module, an estimated value of DC interference can be obtained through simple accumulation.

SUMMARY

Embodiments of the present disclosure realizes estimation of DC interference.

In an embodiment of the present disclosure, a method for estimating DC interference is provided, including: performing an accumulative adding calculation on frequency-domain modulation symbols on a corresponding frequency point of DC interference to obtain a real-time accumulated value; updating a historical accumulated value using the real-time accumulated value based on that a number of times of accumulation reaches a first preset number; or calculating a real-time accumulated average value and a long-term accumulated average value based on the real-time accumulated value and a number of times of accumulation, every time a second preset number of frequency-domain modulation symbols are accumulated, wherein the second preset number is smaller than the first preset number; and calculating a DC interference estimated value based on the long-term accumulated average value or an updated historical accumulated value.

In an embodiment of the present disclosure, a non-volatile or non-transitory storage medium storing one or more programs is provided, wherein the one or more programs includes computer instructions, which, when executed by a processor, cause the processor to: perform an accumulative adding calculation on frequency-domain modulation symbols on a corresponding frequency point of DC interference to obtain a real-time accumulated value; update a historical accumulated value using the real-time accumulated value based on that a number of times of accumulation reaches a first preset number; or calculate a real-time accumulated average value and a long-term accumulated average value based on the real-time accumulated value and a number of times of accumulation, every time a second preset number of frequency-domain modulation symbols are accumulated, wherein the second preset number is smaller than the first preset number; and calculate a DC interference estimated value based on the long-term accumulated average value or an updated historical accumulated value.

In an embodiment of the present disclosure, a terminal including a memory and a processor is provided, wherein the memory stores one or more programs, the one or more programs including computer instructions, which, when executed by the processor, cause the processor to: perform an accumulative adding calculation on frequency-domain modulation symbols on a corresponding frequency point of DC interference to obtain a real-time accumulated value; update a historical accumulated value using the real-time accumulated value based on that a number of times of accumulation reaches a first preset number; or calculate a real-time accumulated average value and a long-term accumulated average value based on the real-time accumulated value and a number of times of accumulation, every time a second preset number of frequency-domain modulation symbols are accumulated, wherein the second preset number is smaller than the first preset number; and calculate a DC interference estimated value based on the long-term accumulated average value or an updated historical accumulated value.

DETAILED DESCRIPTION

As described in the background, in 5G NR communication systems, it is impossible to perform the estimation in the time domain for following factors. Scheduling of the 5G NR communication systems is quite flexible, and symbols in a slot may not be fully scheduled. A number of symbols in PDSCH is unknown, and it is possible that rate matching has been performed on some resources. The above information cannot be acquired when performing estimation of DC interference in the time domain, thus, estimation of DC interference cannot be performed in the time domain.

In technical solutions of the present disclosure, modulation symbols are accumulated in a frequency domain. As a DC interference estimated value is relatively small, the estimation requires accumulation for multiple times. Therefore, when a number of times of accumulation reaches a first preset number, a historical accumulated value is used for interference estimation. Alternatively, a long-term accumulated average value is used for interference estimation every time a second preset number of frequency-domain modulation symbols are accumulated. In this manner, the estimation of DC interference in the frequency domain is achieved in a case that interference estimation cannot be performed in a time domain in new radio systems.

The technical solutions of the present disclosure can be applied to 5G communication systems, and various new communication systems in the future, such as 6G and 7G communication systems.

The technical solutions of the present disclosure also can be applied to different network architectures, including but not limited to a relay network architecture, a dual-link architecture, and a Vehicle-to-Everything architecture.

In order to clarify the objects, characteristics and advantages of the disclosure, embodiments of present disclosure will be described in detail in conjunction with accompanying drawings.

Figure 1:
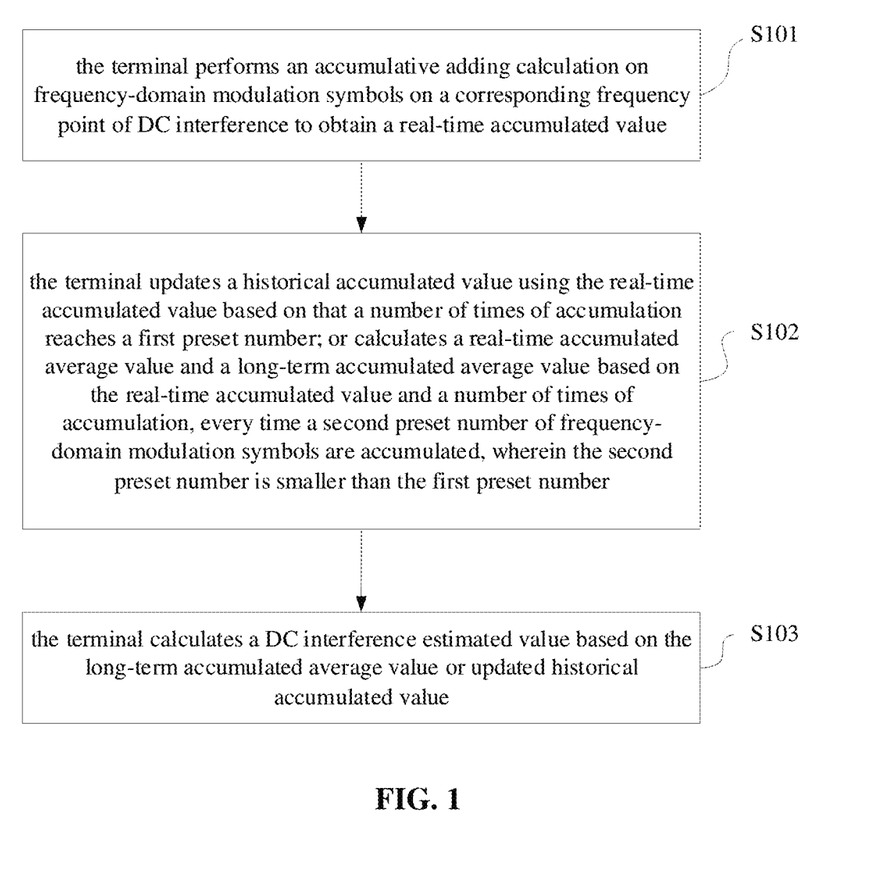
FIG. 1 is a flow chart of a method for estimating DC interference according to an embodiment.

Referring to FIG. 1, FIG. 1 is a flow chart of a method for estimating DC interference according to an embodiment.

The method in the embodiment may be applied to a terminal which may interact with a base station to receive data from the base station. The terminal may include various appropriate terminal devices, such as a mobile phone, a computer, an Internet of Things device or a server, but is not limited thereto.

Specifically, the method shown in FIG. 1 may include S101 to S103.

In S101, the terminal performs an accumulative adding calculation on frequency-domain modulation symbols on a corresponding frequency point of DC interference to obtain a real-time accumulated value.

In S102, the terminal updates a historical accumulated value using the real-time accumulated value based on that a number of times of accumulation reaches a first preset number; or calculates a real-time accumulated average value and a long-term accumulated average value based on the real-time accumulated value and a number of times of accumulation, every time a second preset number of frequency-domain modulation symbols are accumulated, wherein the second preset number is smaller than the first preset number.

In S103, the terminal calculates a DC interference estimated value based on the long-term accumulated average value or an updated historical accumulated value.

It should be noted that sequence numbers of steps in the embodiment do not limit an execution order of the steps.

It could be understood that, in some embodiments, the method may be implemented in a form of a software program which runs in a processor integrated in a chip or a chip module. Alternatively, in some embodiments, the method may be implemented by combining software with hardware, which is not limited in the present disclosure.

As the frequency-domain modulation symbols are in uniform distribution, expectation of the accumulated value of the frequency-domain modulation symbols is zero when the DC interference does not exist. When the DC interference exists, the accumulated value of the frequency-domain modulation symbols is accumulation of the DC interference and may become larger and larger.

In some embodiments, in S101, a summation calculation may be performed on the frequency-domain modulation symbols on the frequency point corresponding to the DC interference in real time, so as to obtain the real-time accumulated value of the frequency-domain modulation symbols. Specifically, a following formula is used to calculate the real-time accumulated value:

$$acc = \sum_{i=0}^{n-1} S_i,$$

where acc is the real-time accumulated value, n is a number of the frequency-domain modulation symbols, and $S_i$ is the i-th frequency-domain modulation symbol.

In some embodiments, in S102, when a number of times of accumulation reaches a first preset number, the real-time accumulated value is used to update a historical accumulated value. For convenience of hardware implementation, the first preset number may be a multiple of 2, such as 64, 128, 256 and so on. A process of updating the historical accumulated value may be a process of weighted summation of the real-time accumulated value and an original historical accumulated value.

Accordingly, in some embodiments, in S103, the DC interference estimated value may be calculated using the updated historical accumulated value. Specifically, a quotient of the historical accumulated value and the number of times of accumulation (i.e., the first preset number).

In some embodiments, the DC interference estimated value is calculated based on:

$$P_{DC} = \frac{acc_{his}^2}{N},$$

where $P_{DC}$ is the DC interference estimated value, $acc_{his}$ is the updated historical accumulated value, and N is the first preset number.

In this embodiment, the DC interference estimated value is calculated once when the number of times of accumulation reaches the first preset number.

In some embodiments, in S102, a real-time accumulated average value and a long-term accumulated average value may be calculated based on the real-time accumulated value and a number of times of accumulation, every time a second preset number of frequency-domain modulation symbols are accumulated. Specifically, a following formula is used to average the real-time accumulated value acc of n symbols:

$$Q(n) = \frac{1}{n} acc(n) = \frac{1}{n} \sum_{i=0}^{n-1} S_i,$$

where Q(n) is the real-time accumulated average value when the number of times of accumulation is n, acc(n) is the real-time accumulated value when the number of times of accumulation is n, n is the number of the frequency-domain modulation symbols, and $S_i$ is the i-th frequency-domain modulation symbol. The long-term accumulated average value may be a weighted sum of the real-time accumulated average value and the historical accumulated average value. The second preset number may be 1 or a multiple of 2, and the second preset number is smaller than the first preset number.

In some embodiments, the first preset number is an integer multiple of the second preset number. For example, the first preset number is 256, and the second preset number is 8.

Accordingly, in some embodiments, in S103, the DC interference estimated value may be calculated based on the long-term accumulated average value. Specifically, a mathematical operation may be performed on the long-term accumulated average value.

In some embodiments, a following formula is used to calculate the DC interference estimated value: $P_{DC}=Q_{longterm}^2$, where $P_{DC}$ is the DC interference estimated value, and $Q_{longterm}$ is the long-term accumulated average value.

With the embodiments of the present disclosure, the estimation of DC interference in the frequency domain is achieved in a case that interference estimation cannot be performed in a time domain in new radio systems.

In some embodiments, S101 as shown in FIG. 1 may include: directly accumulating the frequency-domain modulation symbols on the frequency point corresponding to the DC interference based on that the frequency-domain modulation symbols on the frequency point corresponding to the DC interference are within a same time unit, where the time unit is slot or subframe.

In some embodiments, S101 as shown in FIG. 1 may include: calculating a gain difference between an AGC gain of the current time unit and a historical AGC gain at a start moment of a current time unit, based on that the frequency-domain modulation symbols on the frequency point corresponding to the DC interference are not within a same time unit, where the time unit is slot or subframe; compensating the real-time accumulated value using the gain difference; and performing an accumulative adding calculation based on compensated real-time accumulated value and frequency-domain modulation symbols in the current time unit.

As the DC interference estimated value is relatively small, the estimation requires accumulation for multiple times, thus, there may be accumulation across slots or subframes. As AGC is adjustment at a slot or subframe level, the AGC value of each slot or subframe may be different. Therefore, different from the foregoing embodiments, in this embodiment, AGC compensation is considered during the accumulation of symbols.

Specifically, at the beginning of each slot or subframe, the gain difference is calculated, and AGC gain compensation is performed on the real-time accumulated value, so as to be equal to the AGC gain of the current slot or subframe. In this manner, a symbol value of the current slot or subframe can be accumulated into the compensated real-time accumulated value.

Specifically, the gain difference is calculated in a following manner: $G_{agc\_diff1}=G_{agc\_cur}-G_{agc\_prev}$, where $G_{agc\_diff1}$ is the gain difference, $G_{agc\_cur}$ is the AGC gain of the current slot or subframe, and $G_{agc\_prev}$ is the historical AGC gain. Gain compensation is performed in a following manner: $acc=acc1 \times G_{agc\_diff1}$, where acc is a real-time accumulated value after compensation, acc1 is a real-time accumulated value before compensation, and $G_{agc\_diff1}$ is the gain difference.

Figure 2:
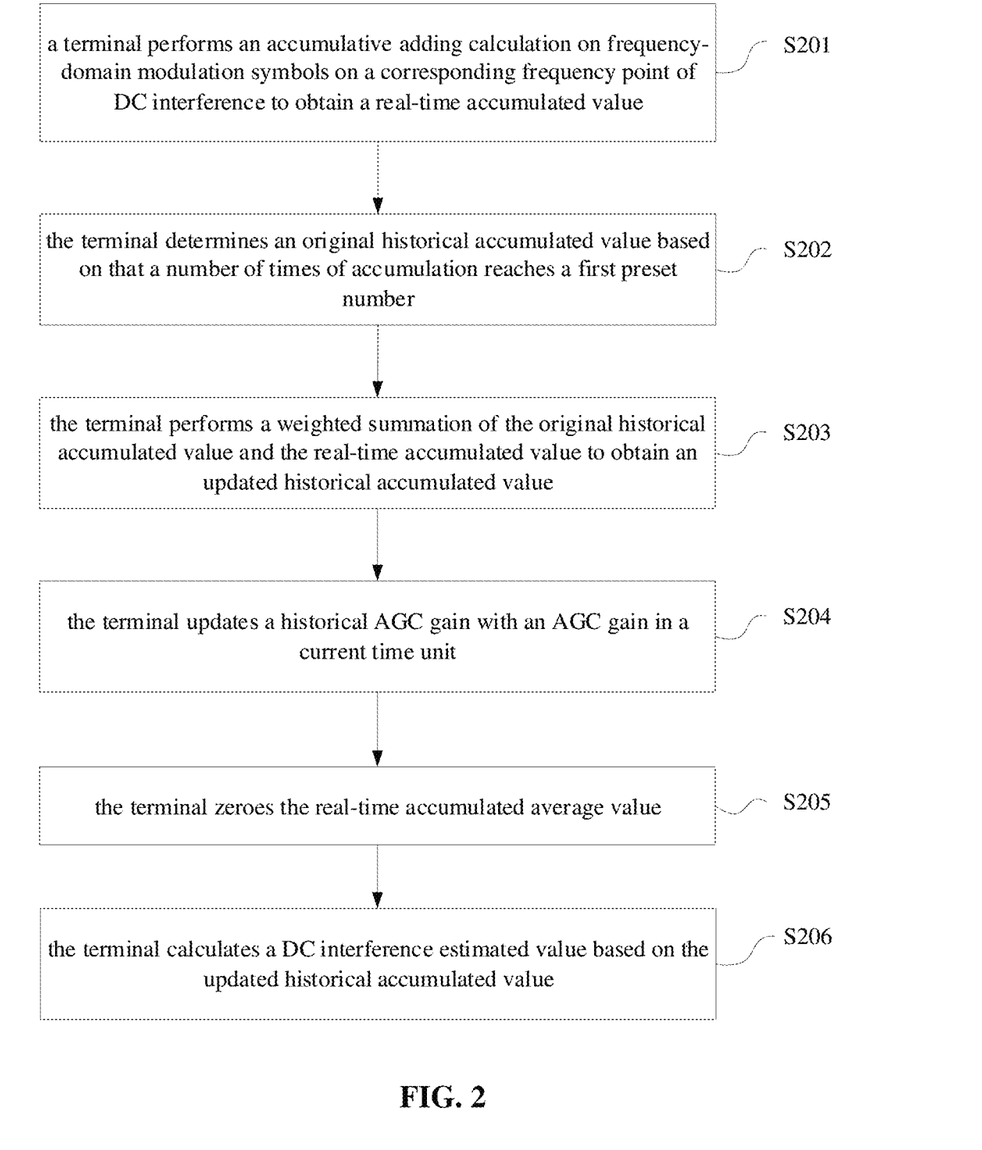
FIG. 2 is a flow chart of a method for estimating DC interference according to an embodiment.

In some embodiments, referring to FIG. 2, the method may include S201 to S206.

In S201, a terminal performs an accumulative adding calculation on frequency-domain modulation symbols on a corresponding frequency point of DC interference to obtain a real-time accumulated value.

In S202, the terminal determines an original historical accumulated value based on that a number of times of accumulation reaches a first preset number.

In S203, the terminal performs a weighted summation of the original historical accumulated value and the real-time accumulated value to obtain an updated historical accumulated value.

In S204, the terminal updates a historical AGC gain with an AGC gain in a current time unit.

In S205, the terminal zeroes the real-time accumulated average value.

In S206, the terminal calculates a DC interference estimated value based on the updated historical accumulated value.

Specific implementation manners of S201 and S206 may be referred to related embodiments of S101 and S103 as described above and are not repeated here.

In some embodiments, in S202 to S205, based on that the number of times of accumulation reaches the first preset number, the historical accumulated value and the historical AGC gain are updated, and the real-time accumulated value is zeroed.

In some embodiments, the updated historical AGC gain is an AGC gain of a current slot or subframe. The updated historical accumulated value is a weighted sum of the original historical accumulated value and the real-time accumulated value.

In some embodiments, a following formula is used to calculate the updated historical accumulated value: $acc_{his}=acc1_{his} \times G_{agc\_diff2} \times \alpha + acc \times (1-\alpha)$, where $acc_{his}$ is the updated historical accumulated value, $acc1_{his}$ is the original historical accumulated value, $G_{agc\_diff2}$ is a difference between the AGC gain of the current slot or subframe and the historical AGC gain, acc is the real-time accumulated value, $\alpha$ is a first preset weight, and [0,1]. In some embodiments, $\alpha=0.5$. Optionally, other values may be taken.

Therefore, every time N (the first preset number) symbols are accumulated, the historical accumulated value $acc_{his}$ and its corresponding historical AGC gain are updated once, and the DC interference is estimated once. That is, estimation frequency of the DC interference is 1/N.

In a specific application scenario, the real-time accumulated value is stored in a register. Every time each pair of symbols is accumulated, the value in the register is updated once. When the number of times of accumulation reaches the first preset number, the register is zeroed to avoid subsequent accumulation overflow. A counter may be maintained to record the number of times of accumulation. Every time each pair of symbols is accumulated, a value in the counter is updated once. When the number of times of accumulation reaches the first preset number, the counter is zeroed. It is also possible to store the historical accumulated value and the historical AGC gain into two registers respectively, and update values of the two registers when the number of times of accumulation reaches the first preset number.

Figure 3:
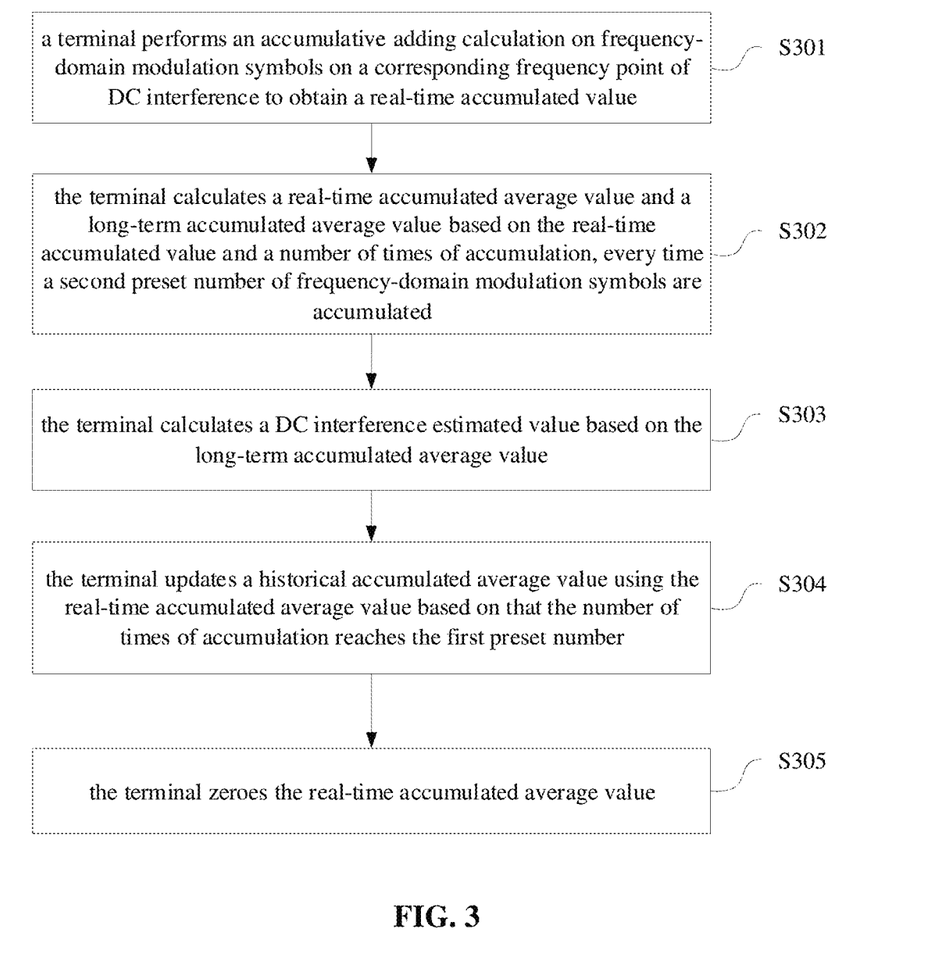
FIG. 3 is a flow chart of a method for estimating DC interference according to an embodiment.

In some embodiments, referring to FIG. 3, the method may include S301 to S305.

In S301, a terminal performs an accumulative adding calculation on frequency-domain modulation symbols on a corresponding frequency point of DC interference to obtain a real-time accumulated value.

In S302, the terminal calculates a real-time accumulated average value and a long-term accumulated average value based on the real-time accumulated value and a number of times of accumulation, every time a second preset number of frequency-domain modulation symbols are accumulated.

In S303, the terminal calculates a DC interference estimated value based on the long-term accumulated average value.

In S304, the terminal updates a historical accumulated average value using the real-time accumulated average value based on that the number of times of accumulation reaches the first preset number.

In S305, the terminal zeroes the real-time accumulated average value.

Specific implementation manners of S301 and S303 may be referred to related embodiments of S101 and S103 as described above and are not repeated here.

In some embodiments, in S302, when calculating the real-time accumulated average value, a following formula may be used to average the real-time accumulated value acc of n symbols:

$$Q(n) = \frac{1}{n}acc(n) = \frac{1}{n}\sum_{i=0}^{n-1} S_i,$$

where $Q(n)$ is the real-time accumulated average value, $acc(n)$ is the real-time accumulated value when the number of times of accumulation is n, n is the number of frequency-domain modulation symbols, and $S_i$ is the ith frequency-domain modulation symbol.

However, in computer implementation, a division operation is relatively complicated, thus, the above formula may be expanded, and the division operation can be converted into an addition operation as shown in a following formula:

$$Q(n) = \frac{1}{n}acc(n) = \frac{1}{n}\sum_{i=0}^{n-1} S_i = \frac{1}{n}\left(S_{n-1} + \sum_{i=0}^{n-2} S_i\right) =$$

$$\frac{1}{n}\left[S_{n-1} + (n-1)\frac{1}{n-1}\sum_{i=0}^{n-2} S_i\right] = \frac{1}{n}[S_{n-1} + (n-1)Q(n-1)] =$$

$$\frac{1}{n}[S_{n-1} + nQ(n-1) - Q(n-1)] = Q(n-1) + \frac{1}{n}[S_{n-1} - Q(n-1)]$$

where $Q(n-1)$ is the real-time accumulated average value when the number of times of accumulation is $(n-1)$, and $S_{n-1}$ is the $(n-1)$th frequency-domain modulation symbol.

In some embodiments, the long-term accumulated average value is calculated based on the real-time accumulated average value and the historical accumulated average value. Specifically, a following formula may be used to calculate the long-term accumulated average value $Q_{longterm}$: $Q_{longterm} = \beta(n)Q(n) + [1-\beta(n)]Q_{his}$, where, n is the number of times of accumulation, N is the first preset number, and $Q_{his}$ is the historical accumulated average value.

It should be noted that the weight may be other values within a range of [0,1], which is not limited in the embodiments of the present disclosure.

When the number of times of accumulation reaches the first preset number, such as 64, 128 or 256, the historical accumulated average value is updated, that is, $Q_{his} = Q1_{his} \times \alpha + Q(N) \times (1-\alpha)$, where $Q_{his}$ is the updated historical accumulated average value, $Q1_{his}$ is the historical accumulated average value before update, and $\alpha$ is a preset weight, such as 0.5.

Further, when updating the historical accumulated average value, gain compensation may further be performed on the historical accumulated average value, that is, $Q_{his} = Q1_{his} \times \alpha \times G_{agc\_diff2} + Q(N) \times (1-\alpha)$, $G_{agc\_diff2}$ is a difference between an AGC gain of a current slot or subframe and a historical AGC gain.

In a specific application scenario, the real-time accumulated average value is stored in a register, and when the number of times of accumulation reaches the first preset number, the register is zeroed to avoid subsequent accumulation overflow. A counter may be maintained to record the number of times of accumulation. Every time each pair of symbols is accumulated, a value in the counter is updated once. Every time a second preset number (for example, 1 or 8) of symbols are accumulated, the value of the counter storing the real-time accumulated average value is updated once. When the number of times of accumulation reaches the first preset number (for example, 64 or 256), the counter is zeroed. It is also possible to store the historical accumulated average value and the historical AGC gain into two registers respectively and update the values of the two registers when the number of times of accumulation reaches the first preset number.

Further, when calculating the real-time accumulated average value, if calculated according to a following formula $$Q(n) = \frac{1}{n}acc(n) = \frac{1}{n}\sum_{i=0}^{n-1} S_i = \frac{1}{n}\left(S_{n-1} + \sum_{i=0}^{n-2} S_i\right) =$$

$$\frac{1}{n}\left[S_{n-1} + (n-1)\frac{1}{n-1}\sum_{i=0}^{n-2} S_i\right] = \frac{1}{n}[S_{n-1} + (n-1)Q(n-1)] =$$

$$\frac{1}{n}[S_{n-1} + nQ(n-1) - Q(n-1)] = Q(n-1) + \frac{1}{n}[S_{n-1} - Q(n-1)]$$

as the number n of times of accumulation increases, a step size 1/n changes accordingly. If the second preset number is 1, that is, every time one symbol is accumulated, the real-time accumulated average value is calculated once, computational complexity may be increased as complexity of a division operation is high. In addition, increase in the number of times of accumulation also has higher requirements for calculation accuracy. Therefore, in the embodiments of the present disclosure, the step size 1/n may be set as a preset value (for example, it can be set to any practicable value according to actual application requirements), that is, every time M symbols are accumulated, the real-time accumulated average value is calculated one. A calculation formula of the real-time accumulated average value is as follows:

$$Q(n) = Q(aM) = \frac{1}{aM}\sum_{i=0}^{n-1} S_i = \frac{1}{n}\left(\sum_{i=1}^{M} S_{n-i} + \sum_{i=0}^{n-M-1} S_i\right) = \frac{1}{n}\left[\sum_{i=1}^{M} S_{n-i} + (n-M)\frac{1}{n-M}\sum_{i=0}^{n-M-1} S_i\right]$$

$$= \frac{1}{n}\left[\sum_{i=1}^{M} S_{n-i} + (n-M)Q(n-M)\right] = \frac{1}{n}\left[\sum_{i=1}^{M} S_{n-i} + nQ(n-M) - MQ(n-M)\right]$$

$$= Q(n-M) + \frac{1}{n}\left[\sum_{i=1}^{M} S_{n-i} - MQ(n-M)\right] = Q((a-1)M) + \frac{1}{a \times M}\left[\sum_{i=1}^{M} S_{n-i} - MQ((a-1)M)\right]$$

$$= Q((a-1)M) + \frac{1}{a}\left[\frac{1}{M}\sum_{i=1}^{M} S_{n-i} - Q((a-1)M)\right],$$

where $Q((a-1)M)$ is the real-time accumulated average value when the number of times of accumulation is $(a-1)M$, a is a constant, M is a preset constant, and $S_{n-i}$ is the $(n-i)$th frequency-domain modulation symbol.

Compared with the foregoing embodiments where the DC interference estimated value is calculated only when the number of times of accumulation reaches the first preset number, in the embodiments, the estimation is performed every time the second preset number of symbols are accumulated, which increases estimation frequency. For example, the first preset number is 256, and the second preset number is 8. In the embodiments of the present disclosure, the estimation frequency is increased from 1/256 (that is, estimation occurs once only in dozens of subframes) to 1/8. The frequency of DC interference estimation is greatly improved, and accuracy of estimation is enhanced as well.

Figure 4:
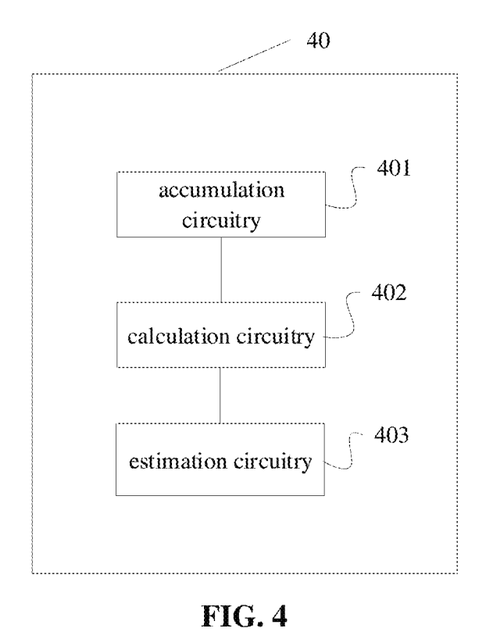
FIG. 4 is a structural diagram of an apparatus for estimating DC interference according to an embodiment.

Referring to FIG. 4, FIG. 4 is a structural diagram of an apparatus 40 for estimating DC interference according to an embodiment. The apparatus 40 includes an accumulation circuitry 401, a calculation circuitry 402 and an estimation circuitry 403.

The accumulation circuitry 401 is configured to perform an accumulative adding calculation on frequency-domain modulation symbols on a corresponding frequency point of DC interference to obtain a real-time accumulated value.

The calculation circuitry 402 is configured to: update a historical accumulated value using the real-time accumulated value based on that a number of times of accumulation reaches a first preset number; or calculate a real-time accumulated average value and a long-term accumulated average value based on the real-time accumulated value and a number of times of accumulation, every time a second preset number of frequency-domain modulation symbols are accumulated, wherein the second preset number is smaller than the first preset number.

The estimation circuitry 403 is configured to calculate a DC interference estimated value based on the long-term accumulated average value or an updated historical accumulated value.

With the embodiments of the present disclosure, the estimation of DC interference in the frequency domain is achieved in a case that interference estimation cannot be performed in a time domain in new radio systems.

More details of working principles and working modes of the apparatus 40 can be referred to related descriptions in FIG. 1 and FIG. 2 and are not repeated here.

The apparatus 40 may be a chip or a chip module.

Each module/unit of each apparatus and product described in the above embodiments may be a software module/unit or a hardware module/unit or may be a software module/unit in part, and a hardware module/unit in part. For example, for each apparatus or product applied to or integrated in a chip, each module/unit included therein may be implemented by hardware such as circuits; or, at least some modules/units may be implemented by a software program running on a processor integrated inside the chip, and the remaining (if any) part of the modules/units may be implemented by hardware such as circuits. For each apparatus or product applied to or integrated in a chip module, each module/unit included therein may be implemented by hardware such as circuits. Different modules/units may be disposed in a same component (such as a chip or a circuit module) or in different components of the chip module. Or at least some modules/units may be implemented by a software program running on a processor integrated inside the chip module, and the remaining (if any) part of the modules/units may be implemented by hardware such as circuits. For each apparatus or product applied to or integrated in a terminal, each module/unit included therein may be implemented by hardware such as circuits. Different modules/units may be disposed in a same component (such as a chip or a circuit module) or in different components of the terminal. Or at least some modules/units may be implemented by a software program running on a processor integrated inside the terminal, and the remaining (if any) part of the modules/units may be implemented by hardware such as circuits.

In an embodiment of the present disclosure, a computer-readable storage medium having computer instructions stored therein is provided, wherein when the computer instructions are executed, any one of the above methods as shown in FIGS. 1 to 3 is performed. In some embodiments, the storage medium may include a ROM, a RAM, a magnetic disk or an optical disk. In some embodiments, the storage medium may include a non-volatile or a non-transitory memory.

In an embodiment of the present disclosure, a terminal including a memory and a processor is provided, wherein the memory has computer instructions stored therein, and when the processor executes the computer instructions, any one of the above methods as shown in FIGS. 1 to 3 is performed. The terminal may include but not limited to a mobile phone, a computer or a tablet computer.

The base station in the embodiments of the present disclosure may also be referred to as a base station equipment, and is a device deployed in a wireless access network to provide wireless communication functions. For example, an equipment that provides a base station function in a 2G network includes a Base Transceiver Station (BTS) and a Base Station Controller (BSC). An equipment that provides the base station function in a 3G network includes a Node B and a Radio Network Controller (RNC). An equipment that provides the base station function in a 4G network includes an evolved node B (eNB). In a Wireless Local Area Network (WLAN), an equipment that provides the base station function is an Access Point (AP). An equipment that provides the base station function in a 5G New Radio (NR) includes gNB and a continuously evolved Node B (ng-eNB), where gNB and the terminal use NR technology for communication, ng-eNB and the terminal use Evolved Universal Terrestrial Radio Access (E-UTRA) technology for communication, and both gNB and ng-eNB can be connected to a 5G core network. And the base station also refers to an equipment that provides the base station function in a new communication system in the future.

The base station controller in the embodiments of the present disclosure is a device for managing base stations, such as a Base Station Controller (BSC) in a 2G network, a Radio Network Controller (RNC) in a 3G network, or a device that controls and manages a base station in a new communication system in the future.

The network in the embodiments of the present disclosure refers to a communication network that provides communication services for terminals, including a base station of a radio access network, a base station controller of a radio access network, and a device on a core network side.

A terminal in the embodiments of the present disclosure may refer to various forms of UE, access terminal, user unit, user station, Mobile Station (MS), remote station, remote terminal, mobile equipment, user terminal, terminal equipment, wireless communication equipment, user agent or user device. The terminal equipment may further be a cellular phone, a cordless phone, a Session Initiation Protocol (SIP) phone, a Wireless Local Loop (WLL) station, a Personal Digital Assistant (PDA), a handheld device with a wireless communication function, a computing device or other processing devices connected to a wireless modems, an in-vehicle device, a wearable device, a terminal equipment in the future 5G network, or a terminal equipment in a future evolved Public Land Mobile Network (PLMN), which is not limited in the embodiments of the present disclosure.

It should be understood that the term "and/or" in the present disclosure is merely an association relationship describing associated objects, indicating that there can be three types of relationships, for example, A and/or B can represent "A exists only, both A and B exist, B exists only. In addition, the character "I" in the present disclosure represents that the former and latter associated objects have an "or" relationship.

The "plurality" in the embodiments of the present disclosure refers to two or more.

The descriptions of the first, second, etc. in the embodiments of the present disclosure are merely for illustrating and differentiating the objects, and do not represent the order or the particular limitation of the number of devices in the embodiments of the present disclosure, which do not constitute any limitation to the embodiments of the present disclosure.

The "connection" in the embodiments of the present disclosure refers to various connection ways such as direct connection or indirect connection to realize communication between devices, which is not limited in the embodiments of the present disclosure.

In the embodiments of the present disclosure, the processor may be a Central Processing Unit (CPU), or other general processors, Digital Signal Processors (DSPs), Application Specific Integrated Circuits (ASICs), Field Programmable Gate Arrays (FPGAs) or other Programmable logic devices, discrete gates or transistor logic devices, discrete hardware components, and the like. A general processor may be a microprocessor, or the processor may be any conventional processor or the like.

It should also be understood that the memory in the embodiments of the present disclosure may be either volatile memory or nonvolatile memory or may include both volatile and nonvolatile memories. The non-volatile memory may be a Read-Only Memory (ROM), a Programmable ROM (PROM), an Erasable PROM (EPROM), an electrically Erasable EPROM (EEPROM), or a flash memory. The volatile memory may be a Random Access Memory (RAM) which functions as an external cache. By way of example but not limitation, various forms of RAM are available, such as Static Random Access Memory (SRAM), Dynamic Random Access Memory (DRAM), Synchronous Dynamic Random Access Memory (SDRAM), Double Data Rate Synchronous Dynamic Random Access Memory (DDR SDRAM), Enhanced SDRAM (ESDRAM), Synchronous connection to DRAM (SLDRAM), and Direct Rambus RAM (DR-RAM).

The above embodiments may be implemented in whole or in part by software, hardware, firmware, or any combination thereof. When implemented in software, the above embodiments may be implemented in whole or in part in the form of a computer program product. The computer program product includes one or more computer instructions or computer programs. The procedures or functions according to the embodiments of the present disclosure are wholly or partially generated when the computer instructions or the computer programs are loaded or executed on a computer. The computer may be a general-purpose computer, a special purpose computer, a computer network, or other programmable device. The computer instructions may be stored in a computer readable storage medium or transmitted from one computer readable storage medium to another computer readable storage medium, for example, the computer instructions may be transmitted from one website, computer, server or data center to another website, computer, server or data center by wire (e.g., infrared, wireless, microwave and etc.). The computer readable storage medium may be any available medium that can be accessed by a computer or a data storage device such as a server or a data center that contains one or more sets of available media. The available medium may be a magnetic medium (e.g., floppy disk, hard disk or magnetic tape), an optical medium (e.g., DVD), or a semiconductor medium. The semiconductor medium may be a solid disk.

In the above embodiments of the present disclosure, it should be understood that the disclosed method, device and system may be implemented in other ways. For example, the above device embodiments are merely illustrative, and for example, division of units is merely one logical division, and other divisions may be realized in practice, for example, a plurality of units or components may be combined or integrated into another system, or some features may be omitted, or not executed. Further, the shown or discussed mutual coupling or direct coupling or communication connection may be an indirect coupling or communication connection via some interfaces, devices, or units, and may be in an electrical, mechanical or other form.

The units described as separate parts may or may not be physically separate, and parts shown as units may or may not be physical units, that is, may be disposed in one place, or may be distributed on a plurality of network units. Some or all of the units can be selected according to practical requirements to achieve the purpose of the solutions of the embodiments.

In addition, functional units in the embodiments of the present disclosure may be integrated in one processing unit, or each unit may be physically separate, or two or more units may be integrated in one unit. The integrated units can be realized in a form of hardware, or in a form of hardware plus a software functional unit.

The integrated units implemented in the form of the software functional unit may be stored in a computer readable storage medium. The software functional unit is stored in a storage medium and includes several instructions for causing a computer device (a personal computer, a server, or a network device) to execute some steps of the methods in the embodiments of the present disclosure. And the storage medium may be a medium for storing program codes, such as a U disk, a removable hard disk, a ROM, a RAM, a magnetic disk, or an optical disk.

Although the present disclosure has been disclosed above with reference to preferred embodiments thereof, it should be understood that the disclosure is presented by way of example only, and not limitation. Those skilled in the art can modify and vary the embodiments without departing from the spirit and scope of the present disclosure.

What is claimed is:

1. A method for estimating Direct Current (DC) interference, comprising:
   performing an accumulative adding calculation on frequency-domain modulation symbols on a corresponding frequency point of DC interference to obtain a real-time accumulated value;
   updating a historical accumulated value using the real-time accumulated value based on that a number of times of accumulation reaches a first preset number; or calculating a real-time accumulated average value and a long-term accumulated average value based on the real-time accumulated value and a number of times of accumulation, every time a second preset number of frequency-domain modulation symbols are accumulated, wherein the second preset number is smaller than the first preset number; and calculating a DC interference estimated value based on the long-term accumulated average value or the updated historical accumulated value.

2. The method according to claim 1, wherein said performing an accumulative adding calculation on frequency-domain modulation symbols on a corresponding frequency point of DC interference to obtain a real-time accumulated value comprises:

directly accumulating the frequency-domain modulation symbols on the frequency point corresponding to the DC interference based on that the frequency-domain modulation symbols on the frequency point corresponding to the DC interference are within a same time unit, wherein the time unit is slot or subframe.

3. The method according to claim 1, wherein said performing an accumulative adding calculation on frequency-domain modulation symbols on a corresponding frequency point of DC interference to obtain a real-time accumulated value comprises:

calculating a gain difference between an Automatic Gain Control (AGC) gain of a current time unit and a historical AGC gain at a start moment of the current time unit, based on that the frequency-domain modulation symbols on the frequency point corresponding to the DC interference are not within a same time unit, wherein the time unit is slot or subframe;

compensating the real-time accumulated value using the gain difference; and performing the accumulative adding calculation based on the compensated real-time accumulated value and the frequency-domain modulation symbols in the current time unit.

4. The method according to claim 1, wherein following said updating a historical accumulated value using the real-time accumulated value, the method further comprises:

zeroing the real-time accumulated value.

5. The method according to claim 1, wherein following said calculating a real-time accumulated average value and a long-term accumulated average value based on the real-time accumulated value and a number of times of accumulation, the method further comprises:

updating a historical accumulated average value using the real-time accumulated average value based on that the number of times of accumulation reaches the first preset number; and zeroing the real-time accumulated average value.

6. The method according to claim 1, wherein said calculating a real-time accumulated average value and a long-term accumulated average value based on the real-time accumulated value and a number of times of accumulation comprises:

calculating the long-term accumulated average value based on the real-time accumulated average value and updated the historical accumulated value.

7. The method according to claim 1, wherein said updating a historical accumulated value using the real-time accumulated value comprises:

determining an original historical accumulated value; and
performing a weighted summation of the original historical accumulated value and the real-time accumulated value to obtain the updated historical accumulated value.

8. The method according to claim 7, wherein said performing a weighted summation of the original historical accumulated value and the real-time accumulated value comprises:

calculating a difference between an AGC gain of a current time unit and a historical AGC gain, wherein the time unit is slot or subframe;

calculating a first product of the original historical accumulated value, the difference, and a first preset weight, and a second product of the real-time accumulated value and a second preset weight; and calculating a sum of the first product and the second product as the updated historical accumulated value.

9. The method according to claim 1, wherein the DC interference estimated value is calculated based on:

$$P_{DC} = \frac{acc_{his}^2}{N},$$

wherein $P_{DC}$ is the DC interference estimated value, $acc_{his}$ is the updated historical accumulated value, and N is the first preset number.

10. The method according to claim 1, wherein the DC interference estimated value is calculated based on:

$$P_{DC}=Q_{longterm}^2,$$

wherein $P_{DC}$ is the DC interference estimated value, and $Q_{longterm}$ is the long-term accumulated average value.

11. The method according to claim 1, wherein following updating a historical accumulated value using the real-time accumulated value, the method further comprises:

updating a historical AGC gain with an AGC gain in a current time unit.

12. A non-transitory storage medium storing one or more programs, the one or more programs comprising computer instructions, which, when executed by a processor, cause the processor to:

perform an accumulative adding calculation on frequency-domain modulation symbols on a corresponding frequency point of Direct Current (DC) interference to obtain a real-time accumulated value;

update a historical accumulated value using the real-time accumulated value based on that a number of times of accumulation reaches a first preset number; or calculate a real-time accumulated average value and a long-term accumulated average value based on the real-time accumulated value and a number of times of accumulation, every time a second preset number of frequency-domain modulation symbols are accumulated, wherein the second preset number is smaller than the first preset number; and calculate a DC interference estimated value based on the long-term accumulated average value or the updated historical accumulated value.

13. A terminal comprising a memory and a processor, wherein the memory stores one or more programs, the one or more programs comprising computer instructions, which, when executed by the processor, cause the processor to:

perform an accumulative adding calculation on frequency-domain modulation symbols on a corresponding frequency point of Direct Current (DC) interference to obtain a real-time accumulated value;

update a historical accumulated value using the real-time accumulated value based on that a number of times of accumulation reaches a first preset number; or calculate a real-time accumulated average value and a long-term accumulated average value based on the real-time accumulated value and a number of times of accumulation, every time a second preset number of frequency-domain modulation symbols are accumulated, wherein the second preset number is smaller than the first preset number; and calculate a DC interference estimated value based on the long-term accumulated average value or the updated historical accumulated value.

14. The terminal according to claim 13, wherein the processor is further caused to:

directly accumulate the frequency-domain modulation symbols on the frequency point corresponding to the DC interference based on that the frequency-domain modulation symbols on the frequency point corresponding to the DC interference are within a same time unit, wherein the time unit is slot or subframe.

15. The terminal according to claim 13, wherein the processor is further caused to:

calculate a gain difference between an Automatic Gain Control (AGC) gain of a current time unit and a historical AGC gain at a start moment of the current time unit, based on that the frequency-domain modulation symbols on the frequency point corresponding to the DC interference are not within a same time unit, wherein the time unit is slot or subframe;

compensate the real-time accumulated value using the gain difference; and perform the accumulative adding calculation based on the compensated real-time accumulated value and the frequency-domain modulation symbols in the current time unit.

16. The terminal according to claim 13, wherein the processor is further caused to:

zero the real-time accumulated value.

17. The terminal according to claim 13, wherein the processor is further caused to:

update a historical accumulated average value using the real-time accumulated average value based on that the number of times of accumulation reaches the first preset number; and zero the real-time accumulated average value.

18. The terminal according to claim 13, wherein the processor is further caused to:

calculate the long-term accumulated average value based on the real-time accumulated average value and the updated historical accumulated average value.

19. The terminal according to claim 13, wherein the processor is further caused to:

determine an original historical accumulated value; and perform a weighted summation of the original historical accumulated value and the real-time accumulated value to obtain the updated historical accumulated value.

20. The terminal according to claim 19, wherein the processor is further caused to:

calculate a difference between an AGC gain of a current time unit and a historical AGC gain, wherein the time unit is slot or subframe;

calculate a first product of the original historical accumulated value, the difference, and a first preset weight, and a second product of the real-time accumulated value and a second preset weight; and calculate a sum of the first product and the second product as the updated historical accumulated value.

* * * * *